(12) United States Patent
Clark et al.

(10) Patent No.: US 6,524,452 B1
(45) Date of Patent: Feb. 25, 2003

(54) ELECTROCHEMICAL CELL (75) Inventors: Duncan Guy Clark, Berkshire (GB); Stephen Hampden Joseph, Sheffield (GB); Herbert Stephen Oates, Swindon (GB)

(73) Assignee: Regenesys Technologies Limited, Wilts (GB)

(*) Notice: Subject to any disclaimer, the term of this patent is extended or adjusted under 35 U.S.C. 154(b) by 0 days.

(21) Appl. No.: 09/806,148

(22) PCT Filed: Sep. 22, 1999

(86) PCT No.: PCT/GB99/03158

§ 371 (c)(1),
(2), (4) Date: Jun. 22, 2001

(87) PCT Pub. No.: WO00/19554

PCT Pub. Date: Apr. 6, 2000

(30) Foreign Application Priority Data

Sep. 29, 1998 (GB) ................................ 9821156

(51) Int. Cl.⁷ ................................ C25B 9/00
(52) U.S. Cl. .............. 204/254; 204/255; 204/280; 429/32; 429/34; 429/35; 429/38; 429/39
(58) Field of Search .................. 204/254, 255, 204/268, 269, 280; 429/32, 34, 35, 36, 38, 39, 72, 88, 14, 18, 152, 153, 210

(56) References Cited

U.S. PATENT DOCUMENTS

| | | |
|---|---|---|
| 3,717,504 A | 2/1973 | Unkle, Jr. |
| 4,415,424 A | 11/1983 | Pere |
| 4,590,134 A | 5/1986 | Warszawski |
| 4,590,135 A | 5/1986 | Warszawski |
| 4,640,876 A | 2/1987 | Warzawski |
| 4,758,481 A | 7/1988 | Fauvel |

FOREIGN PATENT DOCUMENTS

| | | |
|---|---|---|
| EP | 056759 | 7/1982 |
| EP | 471485 | 2/1992 |
| GB | 2158988 | 11/1985 |
| GB | 2158990 | 11/1985 |
| GB | 2163595 | 2/1986 |
| WO | 9400620 | 1/1994 |

OTHER PUBLICATIONS

Patent Abstracts of Japan Application No. 62131582, filed May 1987, published 12–88; Fujii; Electrolyte Bath For Redox–Flow Cell.
Shunt Current Control In Electrochemical Systems Theoretical Analysis; Grimes et al. No month/year available.

*Primary Examiner*—Bruce F. Bell
(74) *Attorney, Agent, or Firm*—Antonelli, Terry, Stout, & Kraus, LLP (57) ABSTRACT

A flow-frame for forming a subassembly; said sub-assembly comprising a bipolar electrode and an ion-selective membrane mounted on said flow-frame and wherein said subassembly may be stacked together with other such subassemblies to create an array of electrochemical cells; wherein said flow-frame is formed from an electrically insulating material and comprises at least four manifold-defining portions which also define pathways for the passage of the anolyte/catholyte. Such pathway may define a labyrinthine path which may be spiral in shape between the manifold and the chamber entry/exit port.

20 Claims, 5 Drawing Sheets

ELECTROCHEMICAL CELL

The present invention relates to electrochemical systems for the storage and delivery of electrical energy and, in particular, to apparatus for building such systems.

BACKGROUND OF THE INVENTION

Industrial electrochemical systems, such as secondary batteries, fuel cells and electrolysers, typically consist of modules which each comprise a number of repeating layered sub-assemblies clamped together to form a stack. For example, in a secondary battery of the redox flow type each sub-assembly typically consists of an electrically insulating flow-frame (i.e. a device which supports the other constituent parts of the sub-assembly and which also defines channels for the flow of electrolytes), a bipolar electrode, an ion-selective membrane or a combined membrane-electrode material and, optionally, other component layers such as meshes or electrocatalytic materials. A plurality of such sub-assemblies may be sandwiched together between suitable end-plates so as to create a plurality of electrochemical cells in series. Each cell thus comprises the positive and negative surfaces of two bipolar electrodes with an ion-selective membrane positioned therebetween so as to define separate anolyte-containing and catholyte-containing chambers within each cell, said chambers optionally comprising additional components such as meshes or electrocatalytic materials. The two electrolytes are typically supplied from two reservoirs to the cell chambers via an electrolyte circulation network. Electrochemical systems of this type are well known to a person skilled in the art.

In the manufacture of components for the creation of such assemblies there are a number of important considerations. In particular, it is desirable to suppress shunt currents within the electrolyte circulation networks. Shunt currents occur because of the conductive pathways that are created by the network of electrolyte connections linking the cell chambers. They are a particular problem for stacks which contain a large number of bipoles and their occurrence decreases the efficiency of the cell. Additionally, it is advantageous to make efficient use of all the available surface area of the electrode. In order to do this the electrolytes must be distributed evenly over the surfaces of the electrodes upon entering the cell chambers. Furthermore, in order to ensure that the fluids which are inside the stack are isolated from each other and contained successfully with minimal leakage to the outside, it is necessary for satisfactory seals to be provided between the individual components within the stack.

The occurrence of shunt currents within such cell arrays is discussed by P. G. Grimes and R. J. Bellows in a paper entitled "Shunt current control methods in electrochemical systems-applications", appearing in Electrochemical Cell Design, R. E. White, Ed.: Plenum Publishing Corp, 1984, page 259. Typically, shunt currents are reduced by the provision of labyrinthine pathways for the electrolytes between the electrolyte circulation networks and the individual cell chambers. One method for achieving such a pathway has been to connect long-tubes between the electrolyte circulation networks and each of the individual cell chambers. However this method suffers from the disadvantage that it requires at least two seals, one at either end of the tube, which complicates the assembly procedure and can cause problems with electrolyte leakage especially since the seals must cope with pressure differentials which usually exist between the internal system and the external environment. Another method for providing a labyrinthine pathway involves forming a long groove into the surface of the flow-frame from a point in communication with the electrolyte circulation network to a point in communication with the individual cell chamber. On stacking the sub-assemblies a plate is sandwiched between successive layers so as to seal the groove and form a labyrinthine pathway for the electrolyte. This method suffers from the disadvantage that the costs of forming the grooves can be high and an extra layer, i.e. the plate, must usually be incorporated into the assembly to provide efficient sealing. This method also often requires large frame areas upon which to form the grooves. Electrolyte leakage is a particular problem in methods for controlling shunt currents which involve labyrinthine pathways for the electrolytes. Efficient fluidic sealing of the pathways is required to prevent leakage and this problem may be exacerbated by the fact that high pumping pressures are often required to push the electrolytes through the narrow pathways. Other solutions to the problem of shunt currents include electrically breaking the circuit by arranging for the flow to break up into droplets or spray or by using some form of syphon; even mechanical water wheel type structures have been proposed. Such solutions are rarely used in practice however because the mechanical and flow regimes are difficult to implement. Other solutions, rather than eliminate the shunt currents, attempt to control their effects, for example, by deliberately shunting the current through an auxiliary electronic circuit or by passing an appropriate current through the common manifold or channel interconnectors. However, these techniques do not necessarily reduce overall power loss.

It would be advantageous to provide a flow-frame, suitable for forming a sub-assembly as described above, which is a repeating structural unit within an array of electrochemical cells formed from a stack of said sub-assemblies. The flow-frame would advantageously provide a framework for supporting all the other elements of the cell array within a sealed environment together with means for providing resistance to shunt currents and means for distributing an even flow of electrolyte through the chambers of each cell.

SUMMARY OF THE INVENTION

Accordingly, the present invention provides a flow-frame for forming a sub-assembly; said sub-assembly comprising a bipolar electrode and an ion-selective membrane mounted on said flow-frame and wherein said sub-assembly may be stacked together with other such sub-assemblies to create an array of electrochemical cells, each cell thus comprising two electrode surfaces with an ion-selective membrane positioned therebetween so as to define separate anolyte-containing and catholyte-containing chambers within each cell; wherein said flow-frame is formed from an electrically insulating material and comprises (i) a chamber-defining portion for supporting an electrode and a membrane within a defined space, (ii) at least four manifold-defining portions which, on stacking said flow-frames, define four manifolds through which the anolyte and the catholyte are supplied to and removed from said anolyte-containing and catholyte-containing chambers, (iii) at least two chamber entry ports for allowing the anolyte and the catholyte to flow from said manifolds into said anolyte-containing and catholyte-containing chambers, and (iv) at least two chamber exit ports for allowing the anolyte and the catholyte to flow from said anolyte-containing and catholyte-containing chambers into said manifolds, characterised in that one or more of the manifold-defining portions also define a pathway for the passage of the anolyte/catholyte between the manifold and the chamber entry/exit port.

Thus, in the present invention, the pathway for the passage of the anolyte/catholyte between the manifolds and the chamber entry/exit ports is formed within the manifold-defining portions of the flow-frame. The pathway may comprise grooves cut into one surface of the manifold-defining portions of the flow-frame. On stacking the flow-frames the grooves are sealed by the flat surface of the manifold-defining portion of the adjacent frame to form sealed pathways. Preferably the pathway defined within the manifold-defining portions does not allow electrolyte to travel in a straight line directly between the manifold and the chamber entry/exit ports. Preferably it causes the electrolyte to take a tortuous or labyrinthine path between the manifold and the chamber entry/exit ports.

The pathway is advantageously incorporated into the manifold-defining portions because pressure differentials which would drive leaks are kept relatively small, reducing the problems associated with the requirement for efficient fluidic sealing of said pathway. Furthermore, because the pathway is formed within the manifold-defining portions any leakage caused by inefficient sealing is contained within the manifold and does not contaminate other parts of the assembled module. Thus the flow-frame of the present invention is more tolerant to leakage than flow-frames known in the art.

Preferably the pathway is substantially spiral in shape. A substantially spiral pathway is preferred for a number of reasons. Firstly, such a pathway avoids sudden drops in fluid pressure which can be caused by the presence of sharp corners in the pathway. Secondly, it achieves the aim of separating fluids at different electrical potentials whilst occupying the minimum space possible. Thirdly, it maintains a near-circular manifold cross-section which is ideal for the efficient flow of electrolytes within the manifold. Finally, it is relatively easy to manufacture.

Preferably, the manifold-defining portions are themselves distanced from the main chamber-defining portion. This further reduces the risks of shunt currents travelling between the chambers and the manifolds.

In a preferred embodiment of the present invention the pathway is defined by a part which is releasably. insertable within said manifold-defining portions. As indicated above the magnitude of the problems associated with shunt currents depends upon the number of bipolar electrodes which make up the complete stack. The greater the number of bipoles the more serious are the losses caused by the occurrence of shunt currents. It is further known that the problems associated with shunt currents also vary according to the nature of the electrolytes in a given system, the position and performance of an individual sub-assembly within the stack itself and the nature of the array of stacks. An advantage of the provision of said releasably insertable parts is that it allows the customisation of individual flow-frames within each sub-assembly to adjust the resistance to shunt currents and simultaneously to adjust the resistance to electrolyte flow in the manifold depending upon the position of the sub-assembly within the stack and also depending upon the size and nature of the stack as a whole. Furthermore, it allows customisation of the individual manifold-defining portions within each flow-frame depending upon the identity of the electrolyte within the manifold and whether it is being supplied to, or removed from, the cell chamber. A further advantage associated with the provision of releasably insertable parts is that when the sub-assemblies are stacked to form a cell array the releasably insertable parts may be staggered relative to one another so that the points within the manifold from which electrolyte is drawn into the pathways are distanced from one another so as to further reduce the effects of shunt currents.

Around the perimeter of the chamber-defining portion of the flow frame it is necessary that the surface topography thereof remains substantially continuous so that when a membrane is included in the layered sub-assembly an efficient seal is formed to ensure that the anolyte and catholyte chambers remain substantially isolated. Such isolation may be achieved with an elastomeric seal, a weld, or by other means. In a preferred embodiment, extending around the perimeter of one surface of the chamber-defining portion of the frame and within the integral sealing means described below is provided a small, substantially continuous, raised portion so that, on stacking the frames, a mechanical pinch is formed between said raised portion on one frame and a flat or grooved surface on the chamber-defining portion of the adjacent frame in the stack. The mechanical pinch is designed to secure a membrane in position when it is included as a part of the sub-assembly in order to limit cross-contamination of electrolytes at the edge of the membrane. The advantages of using a mechanical pinch as described above are that it is relatively easily manufactured as part of the frame and it achieves a sufficiently tight grip to isolate the anolyte and catholyte given that they tend to have only modest pressure differentials. In a preferred embodiment such a mechanical pinch may also be created between the grooves which are cut into the manifold-defining portions by providing a small substantially continuous raised portion between said grooves. In this case the pinch ensures that when the flow-frames are stacked the grooves which create the labyrinthine pathway are isolated from one another so that fluid and current cannot flow between adjacent grooves.

The flow of the electrolytes from the manifolds to the electrolyte chambers, and vice versa, must be effected whilst maintaining the mutual isolation of the anolyte and catholyte containing chambers. The electrolytes enter and exit the anolyte and catholyte chambers by means of the chamber entry/exit ports. In flow-frames known in the art these commonly take the form of flow channels situated entirely within the frame thickness. However this type of channel is difficult to machine or mould. Accordingly, in a preferred embodiment of the present invention one or more of the chamber entry/exit ports comprise optionally releasable inserts shaped so that on insertion into the flow-frame they form flow channels between the end of the pathway defined by the manifold-defining portions and the anolyte/catholyte containing chambers. The outer surface of said insert is preferably shaped so that on placement of the insert within the chamber entry/exit ports the surface topography of the chamber-defining portion of the flow-frame remains continuous in the vicinity of the chamber entry/exit ports. This is advantageous because, as mentioned above, it enables a sufficiently tight seal to be formed between successive sub-assemblies upon stacking and ensures that the membrane layer is tightly gripped between successive flow-frames so as to substantially isolate the anolyte-containing and catholyte-containing chambers from one another. The opposite, inner surface of the insert which contacts the floor of the chamber entry/exit port has one or more grooves cut into the surface, the size and shape of the grooves being determined by the desired flow characteristics for the insert. Preferably the grooves are designed so as to direct the flow of anolyte/catholyte evenly over the surfaces of the electrodes. The flow characteristics desired for a particular chamber entry/exit port within a flow-frame will depend upon a number of factors including the overall size of the stack, the position of the flow-frame within the stack and the flow properties of the electrolytes in question. The inserts can be customised accordingly. Preferably, the inserts are releasably inserted into place so that the flow characteristics of the cell entry/exit ports for a particular flow-frame can be altered simply by inserting a different shaped insert rather than redesigning the entire flow-frame. A further advantage of this design is that the inserts are relatively easy to manufacture and it avoids the need to machine flow channels through the thickness of the flow-frame.

In addition to the provision of releasable inserts within the chamber entry/exit ports, the distribution of the electrolytes over the surfaces of the electrode may be further improved by the inclusion of appropriately sculpted flow distribution means extending over substantially the entire width of both ends of the flow-frame and located at a point adjacent to the chamber entry/exit ports. Upon the formation and stacking of electrode/membrane/frame sub-assemblies the flow distribution means, together with the membrane, define channels for the flow of the electrolytes along the width of either end of the frame and apertures opening into the cell chambers on either side of the electrode for the flow of the electrolytes onto or away from the electrode surfaces. The resistance to fluid flow across the width of the ends of the flow-frame is determined by the cross-sectional area of the channels whilst the resistance to fluid flow onto the surface of the electrode is determined by the size of the aperture opening into the cell chambers. Together, the cross-sectional area of the channels and the size of the aperture act so as to spread the flow of the electrolytes evenly over the surfaces of the electrode. Thus, in a preferred embodiment of the present invention, the resistance to flow across the width of the flow-frame is lowest at the points closest to the chamber entry/exit ports by provision of a channel with a large cross-sectional area and highest at the points furthest from the chamber entry/exit ports by provision of a channel with a low cross-sectional area. The size of the aperture into the cell chambers remains constant across the width of the flow-frame. Thus, at a point close to the chamber entry/exit ports the electrolytes flow easily along the width of the frame either spreading out over the width of the frame or being drawn in from across the width of the frame. In contrast, at a point further from the entry/exit ports the electrolytes flow less easily along the width of the flow frame and are therefore directed towards or drawn from the electrode surfaces. Thus, the electrolytes are supplied to and removed from the electrode surfaces with a more even flow over the entire width of the electrode. In the present invention, the variations in resistance to fluid flow apply simultaneously and in an opposite fashion at either end of the frame.

Preferably the entire perimeter of the flow-frame is provided with means for forming a seal between adjacent frames when they are stacked to form a sub-assembly. More preferably said sealing means comprises an integral sealing means as described in our co-pending application number WO97/24778. The integral sealing means comprises a continuous groove on one face of the frame which defines a female opening having a width of w and a depth of h and a continuous upstand on the other face of the frame having a width of >w and a height of <h. The sealing means is designed to hold the frames together when they are formed into a stack and to prevent the escape of the electrolytes from the cells.

Preferably, extending inwardly from the chamber-defining portion of the frame, is provided means for supporting an electrode within the space defined by said chamber-defining portion.

The flow-frame of the present invention may be formed from any electrically insulating material. Preferably however it may be formed from one or more polymers selected from polyethylene, polypropylene and copolymer blends of ethylene and propylene, acetal, nylons, polystyrene, polyethylene terephthalate, polyvinylidene fluoride, polyvinyl chloride, polytetrafluoroethylene, fluorinated ethylenepropylene copolymer, polyfluoramide, chlorinated polyoxymethylene and many others. The desired configuration for the flow-frame may be formed from these polymeric materials by machining, injection moulding, compression moulding or extrusion.

The present invention also includes within its scope an electrochemical apparatus comprising a flow-frame as hereinbefore described.

The present application also includes within its scope an electrochemical apparatus comprising a plurality of flow-frames, and either a plurality of bipolar electrodes and a plurality of ion-selective membranes or a plurality of combined membrane-electrode materials and, optionally, a plurality of meshes and/or electrocatalytic materials sandwiched together so as to create an array of electrochemical cells.

BRIEF DESCRIPTION OF THE DRAWINGS

The present invention will now be described by way of example with reference to the drawings in which.

DETAILED DESCRIPTION OF THE INVENTION

Figure 1:
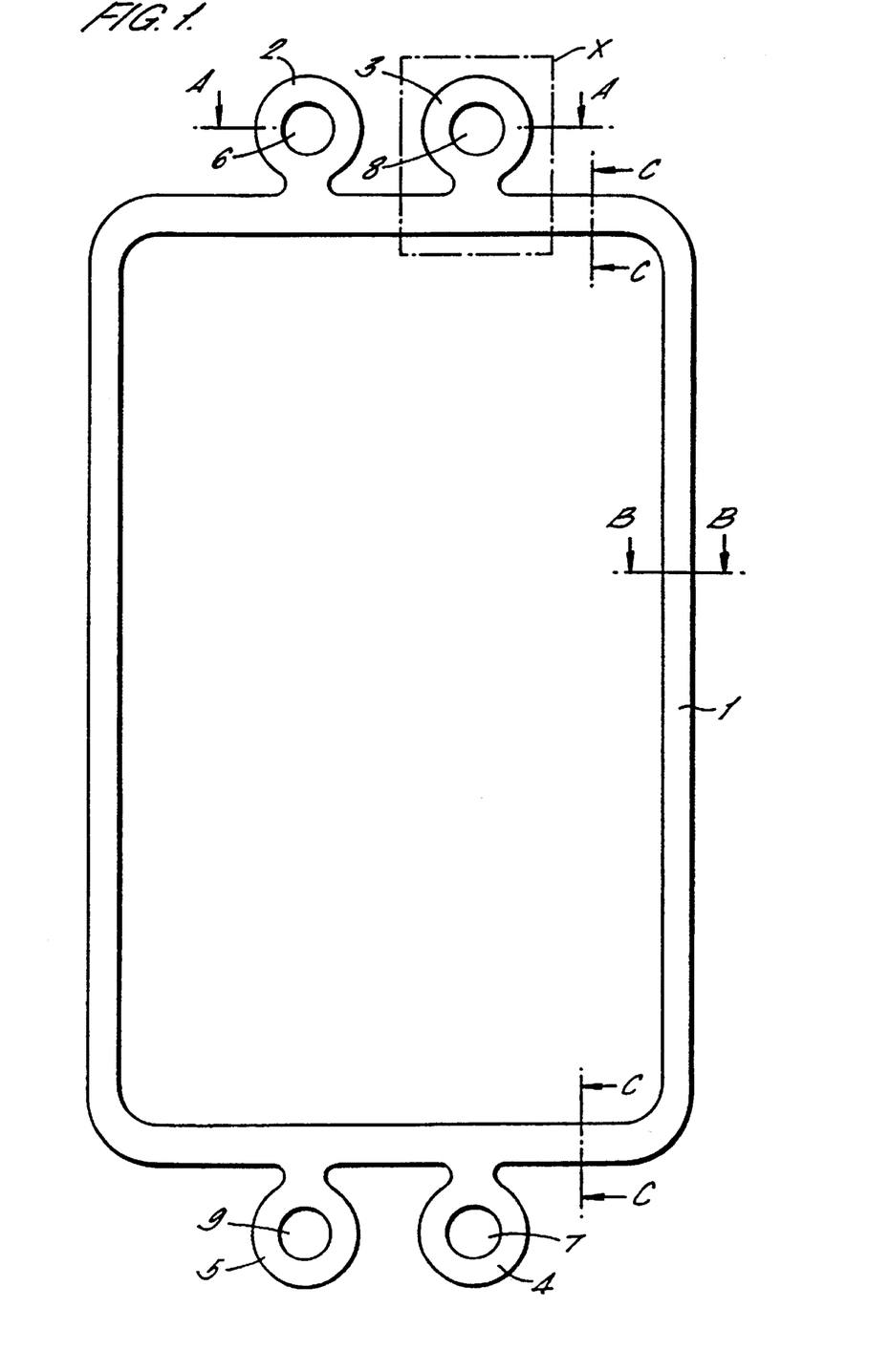
FIG. 1 is a schematic representation of a flow-frame according to the present invention.

Referring to FIG. 1, the flow-frame comprises a substantially rectangular chamber-defining portion 1 with four substantially circular manifold-defining portions 2,3,4 and 5 positioned two at each end of the rectangular chamber-defining portion. The chamber-defining portion serves to support a bipolar electrode and a membrane within the space created therein. The frame/electrode/membrane sub-assembly thus formed may sandwiched together with a plurality of other such sub-assemblies so as to create a plurality of electrochemical cell in series (see FIG. 5). Each cell thus comprises the positive and negative surfaces of two bipolar electrodes with a membrane positioned therebetween so as to define separate anolyte-containing and catholyte-containing chambers within each cell. It will be understood by those skilled in the art that the positioning of the manifold-defining portions relative to the chamber-defining portion and the chosen rectangular and circular shapes of the frame and manifold-defining portions respectively are not critical to the present invention. In the illustrated embodiment the manifold-defining portions 2 and 4 define, upon stacking the frames, manifolds 6 and 7 which may supply/remove the catholyte to/from the catholyte-containing chambers. The other manifold-defining portions 3 and 5 define, upon stacking the frames, manifolds 8 and 9 which may supply/remove the anolyte to/from the anolyte-containing chambers.

Figure 2:
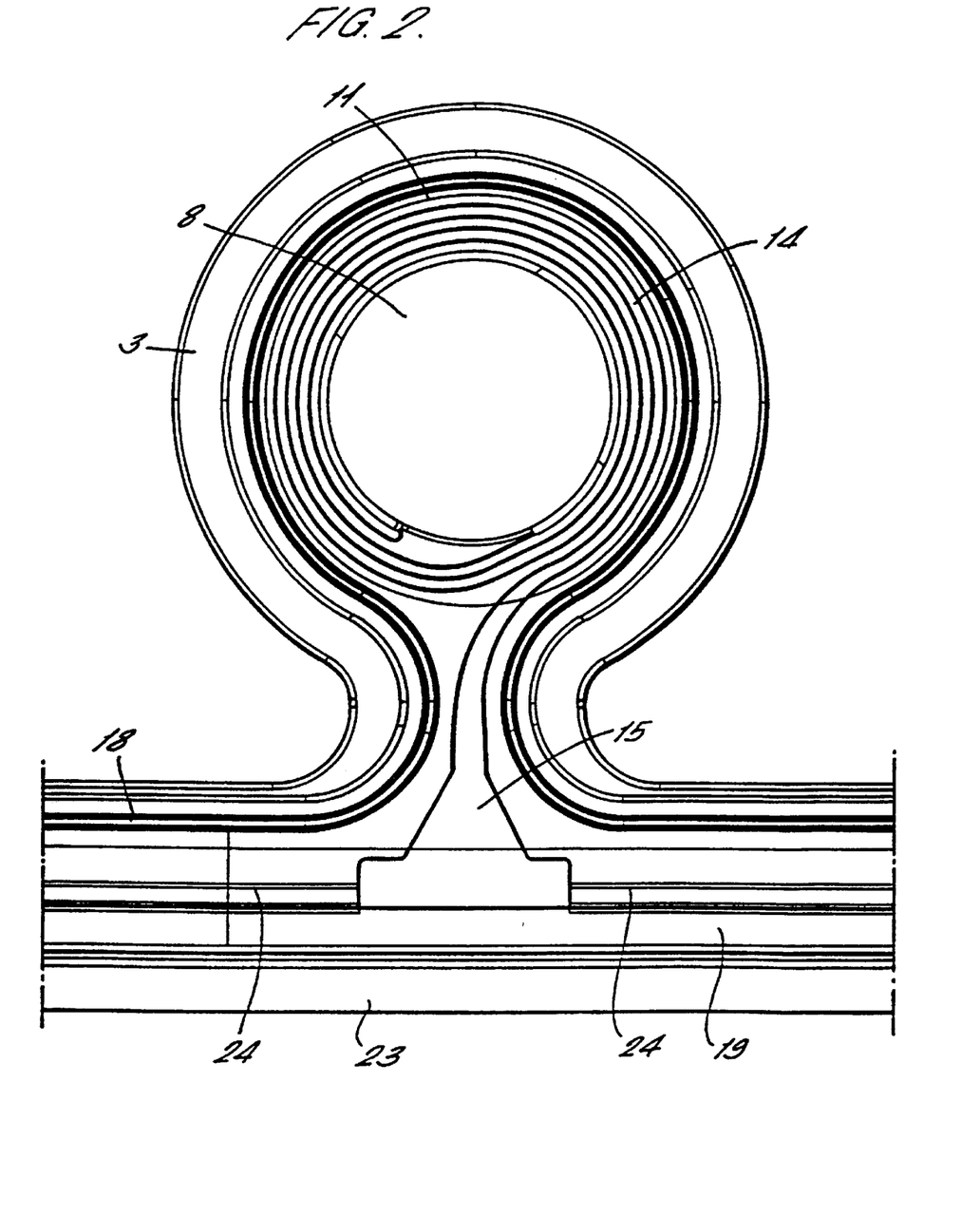
FIG. 2 is a magnified representation of portion X of FIG. 1 showing, in detail, a manifold-defining portion of a flow-frame according to the present invention, including the optionally releasable spiral pathway defining parts but not the optionally releasable inserts.
Figures 3A, 3B:
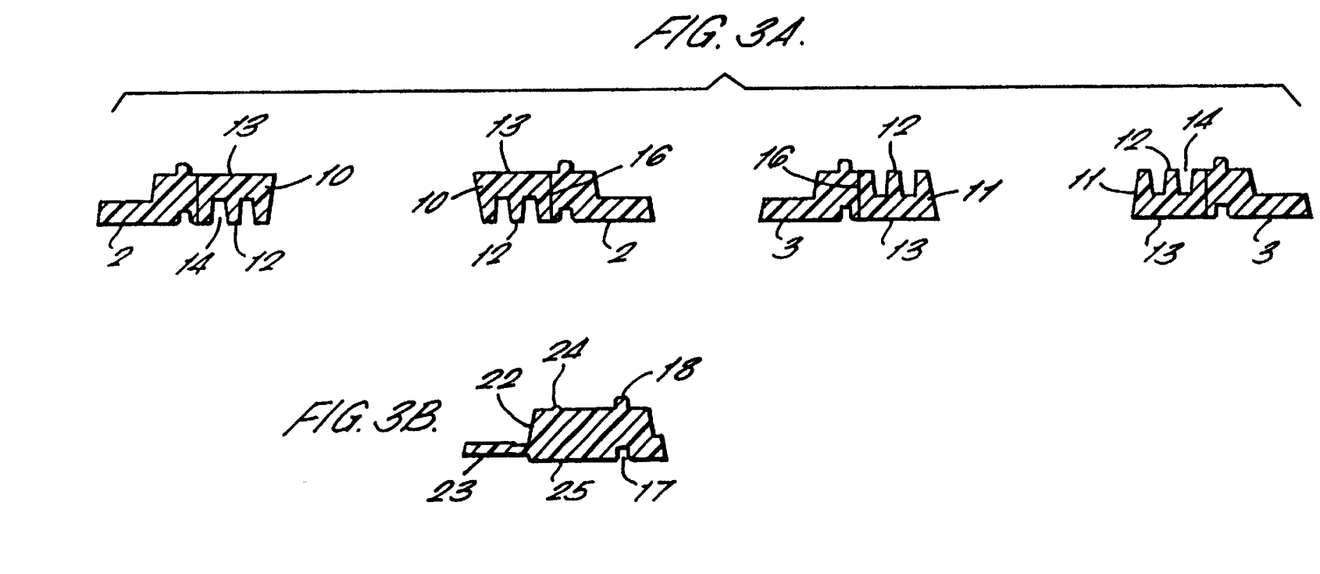
FIGS. 3A, 3B and 3C show cross-sectional views along lines A—A, B—B and C—C respectively.

Referring to FIG. 2 and FIG. 3A, the manifold-defining portions 2 and 3 (only 3 is shown in FIG. 2 but the same structural features are also present in 2, 4 and 5) contain optionally releasable ring-shaped members 10 and 11 (only 11 is shown in FIG. 2) which are shaped so as to provide a tight fit within the manifold-defining portions 2 and 3. Although the illustrated embodiment of the present invention provides a tight fit for retaining the ring-shaped members 10 and 11 within the manifold-defining portions 2 and 3 other means for locating and securing the ring-shaped members in position are envisaged and are included within the scope of the invention. The releasable ring-shaped members 10 and 11 comprise two parallel surfaces 12 and 13, one of which is a substantially flat surface and the other of which comprises a spiral groove 14 cut therein. On stacking the frames, the groove 14 is sealed by the coming together of flat surface 13 of one frame with flat surface 12 of the adjacent frame so as to define an extended spiral pathway for the passage of the anolyte/catholyte between the manifold 8 and the chamber entry/exit port 15. Surface 16 delineates the circumferential face of the optionally releasable members which provides a tight fit with the inner face of the manifold-defining portions. The optionally releasable members may be removed and replaced by a member with a different groove length or different groove cross-sectional area as required. Attention is drawn to the relative orientation of the optionally releasable members 10 and 11 in FIG. 3A of the illustrated embodiment. It will be noted that the grooves are present on opposite faces of the resultant flow frame. Thus the two chamber entry/exit ports which form part of the two manifold-defining portions at one end of the frame supply anolyte/catholyte to opposite faces of an electrode when said electrode is mounted within the rectangular space defined by the chamber-defining portion.

Referring to FIG. 2 and FIG. 3B, adjacent to the perimeter of the flow-frame and extending all the way around the perimeter are means 17 and 18 for forming a seal between successive frames when they are stacked to form an array of electrochemical cells. The means comprise a continuous groove 17 which defines a female opening having a width of w and a depth of h and a continuous upstand 18 having a width of >w and a height of <h.

Figure 3C:
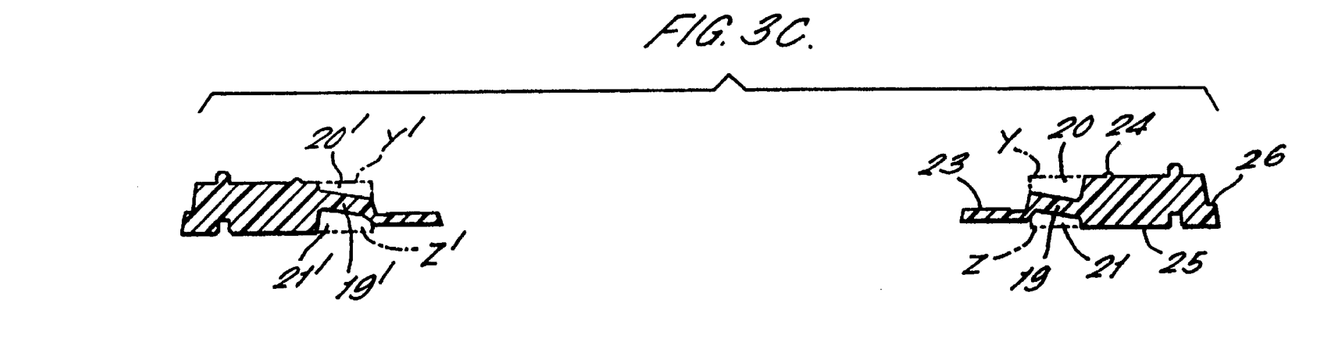

Referring to FIG. 2 and FIG. 3C, at each end of the rectangular chamber-defining portion, at a point adjacent to the chamber entry/exit ports, there are provided sculpted portions 19 and 19' extending over substantially the entire width of the chamber-defining portion which define channels 20, 20', 21 and 21' on either side of the sculpted portions 19 and 19'. The cross-sectional areas Y, Y', Z and Z' of the channels 20, 20', 21 and 21' respectively vary along the length of the sculpted portions, and do so in an opposite fashion at either end of the chamber-defining portion. That is, Y is large when Y' is small and vice versa, whilst Z is large when Z, is small and vice versa. The cross-sectional areas are larger at points close to the chamber entry/exit ports and smaller at points further from the chamber entry/exit ports.

Referring to FIG. 2 and FIGS. 3B and 3C, extending inwardly from the sculpted portions 19 and 19' at each end of the frame and from the inner faces 22 of the sides of the frame, there is provided a continuous lip 23 to which an electrode (not shown) may be attached on forming a sub-assembly.

Referring to FIG. 2 and FIGS. 3B and 3C, extending around the perimeter of one surface of the rectangular chamber-defining portion of the frame, inside the means 17 and 18 for forming a seal between successive frames, is provided a small, substantially continuous, raised portion 24 for forming a mechanical pinch, on stacking the frames, between the raised portion 24 on one frame and the flat surface 25 of the chamber-defining portion of the adjacent frame in the stack. This mechanical pinch is designed to secure the membrane in position when it is included as part of the sub-assembly and to minimise the crossover and/or mixing of electrolytes. The continuity of this raised portion is maintained in the region of the chamber entry/exit ports by an identical raised portion on the surface 33 of the inserts as described below.

Extending from the outer edge of the flow-frame there is provided a lip 26 which aids handling of the flow-frame on assembling and disassembling stacks of sub-assemblies.

Figure 4:
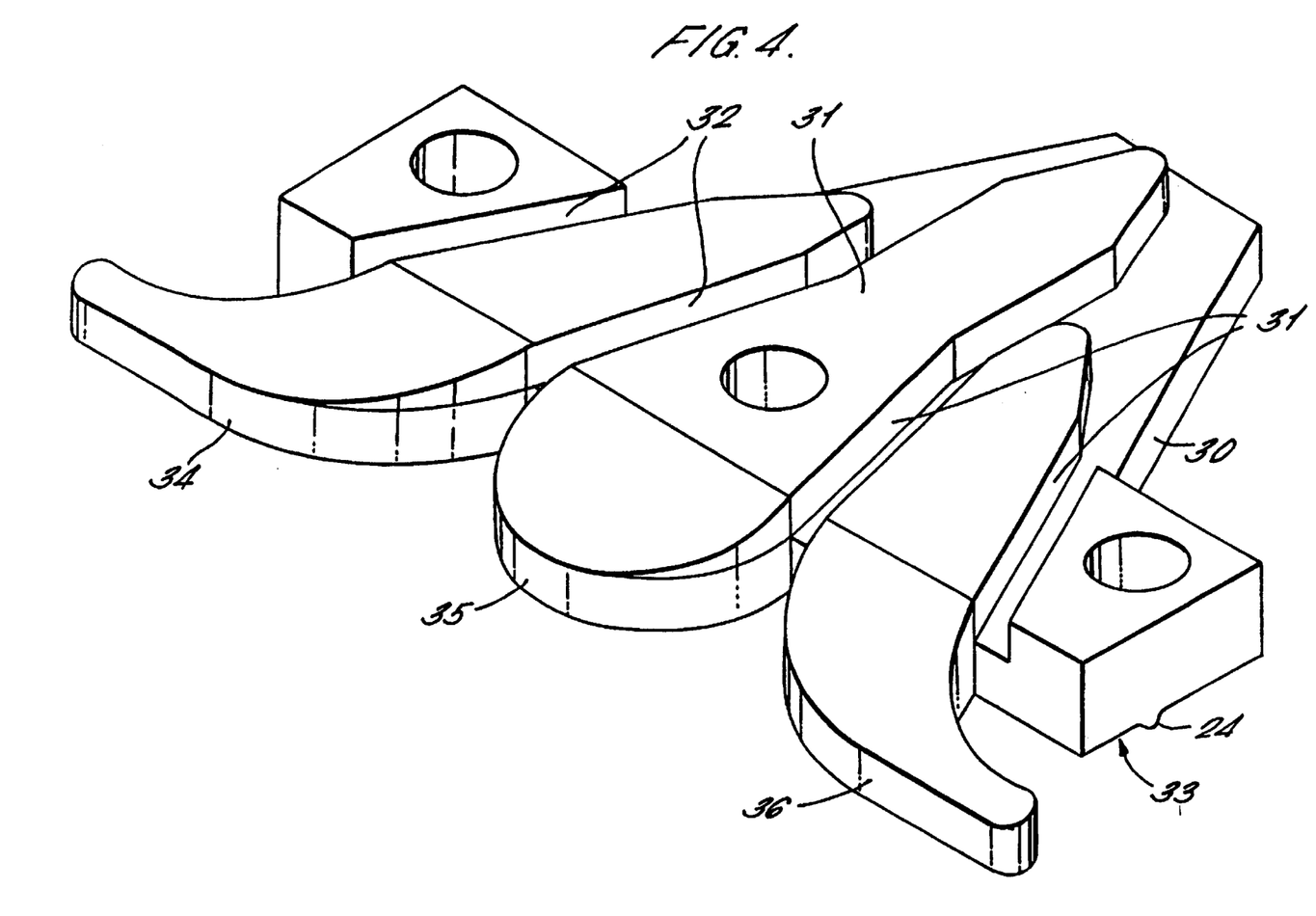
FIG. 4 is a representation of a releasable insert according to the present invention.

Referring to FIG. 4, the insert for the chamber entry/exit ports comprises a body 30 which is shaped so as to provide a tight fit within the chamber entry/exit ports. The surface 31 of the inserts which contacts the floor of the chamber entry/exit ports is provided with a plurality of grooves 32, in this case four, for the passage of the electrolyte. The opposite surface 33 of the insert is shaped so that on placement of the insert within the chamber entry/exit ports the surface topography of the rectangular portion of the frame, including the raised portion 24 remains continuous in the vicinity of the chamber entry/exit ports. The insert of the illustrated embodiment also possesses three shaped projections 34, 35 and 36 which extend from the body 30 of the insert into the regions containing the sculpted portions 19 and 19'. These projections are shaped so as to distribute the flow of electrolyte evenly over the surfaces of the electrode. The design of the releasable inserts can be altered so as to provide different flow characteristics for the flow frame which can thus be customised according to the characteristics desired.

Figure 5:
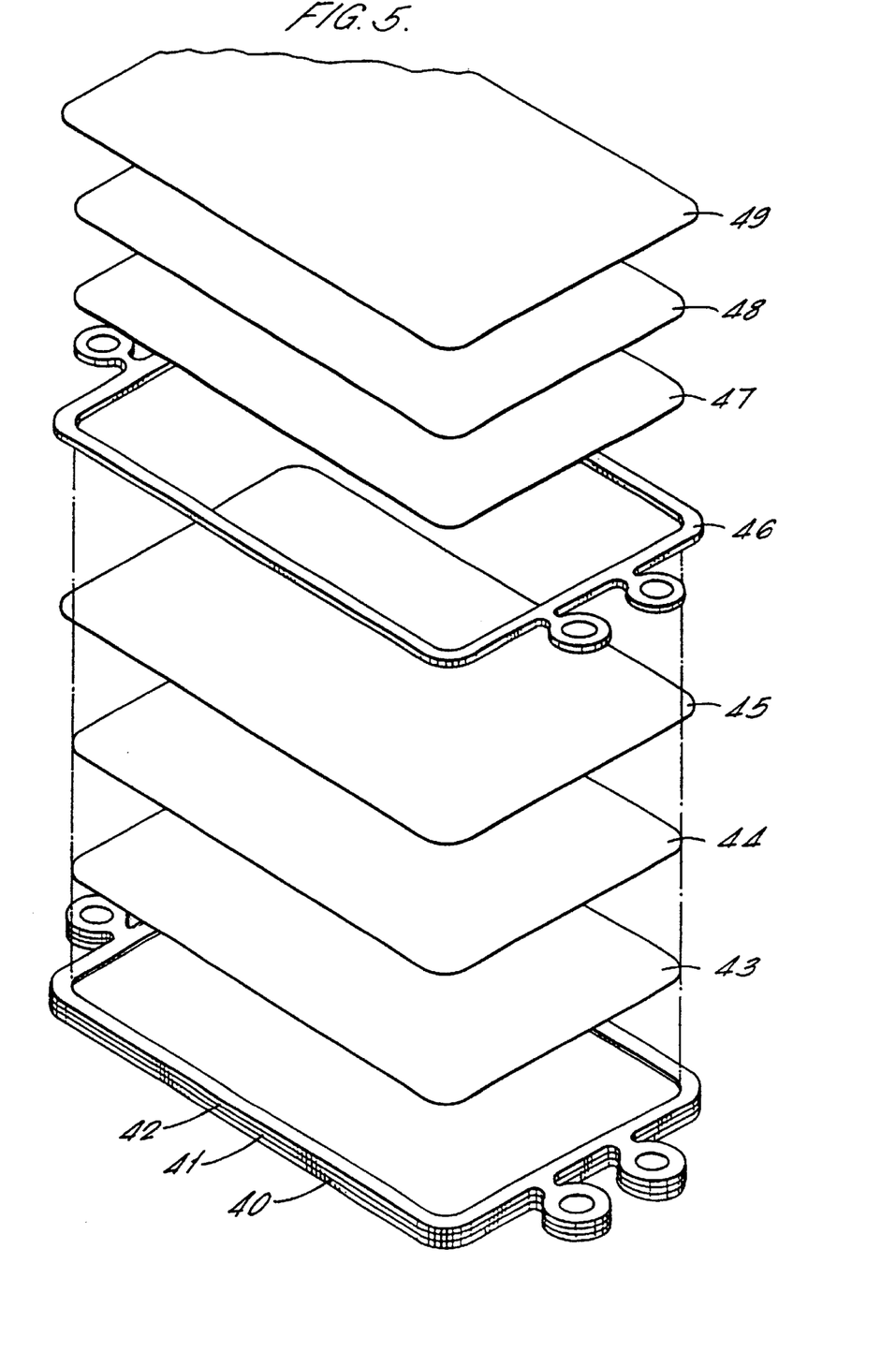
FIG. 5 is an exploded view of a stack of sub-assemblies, each sub-assembly being formed from a flow-frame according to the present invention, a bipolar electrode, an optional mesh or catalytic layer and a membrane. Such a stack may form part of an array of electrochemical cells.

Referring to FIG. 5, there is shown an exploded view of a small stack comprising four sub-assemblies. The first two sub-assemblies and the flow-frame for the third sub-assembly are shown clamped together. Of the first two sub-assemblies, only the flow-frames (40 and 41) are visible. The third and fourth sub-assemblies are exploded to show the constituent layers thereof. The flow-frame 42 for the third sub-assembly supports a bipolar electrode 43 within the space defined by said flow-frame 42. The bipolar electrode may optionally be surfaced on one side with a layer 44 which may be formed from a porous and/or electrocatalytic material. Although not illustrated, it will be appreciated by a person skilled in the art that such a layer of porous and/or electrocatalytic material may alternatively be used to surface the other side of the bipolar electrode. Furthermore, two such layers may be used to surface both sides of the bipolar electrode. The next layer in the sub-assembly is the membrane 45. This layer is slightly larger in area than the bipolar electrode 43 and optional layer 44. Components 42 to 45 make up the third sub-assembly. Similarly, the fourth sub-assembly is made up of a flow-frame 46, a bipolar electrode 47, an optional layer 48 and a membrane 49. The stack may comprise many more than the four sub-assemblies shown in FIG. 5 and in an electrochemical cell comprising such a stack, suitable end-plates (not shown) will be provided at either end of the stack.

What is claimed is:

1. A flow-frame for forming a sub-assembly; said sub-assembly comprising a bipolar electrode and an ion-selective membrane mounted on said flow-frame and wherein said sub-assembly may be stacked together with other such sub-assemblies to create an array of electrochemical cells, each cell thus comprising two electrode surfaces with an ion-selective membrane positioned therebetweeen so as to define separate anolyte-containing and catholyte-containing chambers within each cell; wherein said flow-frame is formed from an electrically insulating material and comprises
   (i) a chamber-defining portion for supporting an electrode and a membrane within a defined space,
   (ii) at least four manifold-defining portions which, on stacking said sub-assemblies, define four manifolds through which the anolyte and the catholyte are supplied to and removed from said anolyte-containing and catholyte-containing chambers,
   (iii) at least two chamber entry ports for allowing the anolyte and the catholyte to flow from said manifolds into said anolyte-containing and catholyte-containing chambers, and
   (iv) at least two chamber exit ports for allowing the anolyte and the catholyte to flow from said anolyte-containing and catholyte-containing chambers into said manifolds, characterised in that one or more of the manifold-defining portions also define a pathway for the passage of the anolyte/catholyte between the manifold and the chamber entry/exit port.

2. A flow-frame as claimed in claim 1 wherein the pathway comprises a groove cut into one surface of a manifold-defining portion of the flow-frame such that on stacking the flow-frames said groove is sealed by the flat surface of the manifold-defining portion of the adjacent frame to form a sealed pathway.

3. A flow-frame as claimed in claim 1 wherein the pathway defines a labyrinthine path between the manifold and the chamber entry/exit port.

4. A flow-frame as claimed in claim 1 wherein the pathway is substantially spiral in shape.

5. A flow-frame as claimed in claim 1 wherein the pathway is defined by a part which is releasably insertable within said manifold-defining portions.

6. A flow-frame as claimed in claim 1 wherein one or more of the chamber entry/exit ports comprise optionally releasable inserts shaped so as to direct the flow of anolyte/catholyte evenly over the surfaces of the electrodes and maintain the surface topography of the chamber-defining portion of the flow-frame.

7. A flow-frame as claimed in claim 1 additionally comprising flow distribution means located adjacent to the chamber entry/exit ports which causes electrolyte to be spread evenly over the surface of the electrode when the flow-frame forms part of a sub-assembly.

8. A flow-frame as claimed in claim 1 additionally comprising sealing means extending around the perimeter of the flow-frame.

9. A flow-frame as claimed in claim 1 additionally comprising means for supporting an electrode within the space defined by the chamber-defining portion.

10. A flow-frame as claimed in clam 1 additionally comprising means for forming a mechanical pinch between the chamber-defining portions of adjacent flow-frames when they are stacked to form an array.

11. A flow-frame as claimed in claim 1 formed from a polymeric material.

12. A flow-frame as claimed in claim 1 which is formed from one or more polymers selected from polyethylene, polypropylene and copolymer blends of ethylene and propylene, acetal, nylons, polystyrene, polyethylene terephthalate, polyvinylidene fluoride, polyvinyl chloride, polytetrafluoroethylene, fluorinated ethylene-propylene copolymer, polyfluoramide or chlorinated polyoxymethylene.

13. A sub-assembly comprising a flow-frame as claimed in claim 1, a bipolar electrode and an ion-selective membrane.

14. An electrochemical apparatus comprising a plurality of sub-assemblies as claimed in claim 13.

15. A sub-assembly as claimed in claim 13 which further comprises a mesh layer and/or an electrocatalytic layer.

16. A sub-assembly comprising a flow-frame as claimed in claim 1 and a combined membrane-electrode material.

17. An electrochemical apparatus comprising a plurality of sub-assemblies as claimed in claim 16.

18. A sub-assembly as claimed in claim 16 which further comprises a mesh layer and/or an electrocatalytic layer.

19. An electrochemical apparatus comprising a flow-frame as claimed in claim 1.

20. An electrochemical apparatus comprising a plurality of flow-frames as claimed in claim 1 sandwiched together so as to create an array of electrochemical cells.

* * * * *